(12) United States Patent
Nate

(10) Patent No.: US 10,243,344 B2
(45) Date of Patent: Mar. 26, 2019

(54) SEMICONDUCTOR DEVICE

(71) Applicant: Rohm Co., Ltd., Kyoto (JP)

(72) Inventor: Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 227 days.

(21) Appl. No.: 15/278,179

(22) Filed: Sep. 28, 2016

(65) Prior Publication Data

US 2017/0093145 A1   Mar. 30, 2017

(30) Foreign Application Priority Data

Sep. 29, 2015   (JP) ................................. 2015-190702

(51) Int. Cl.

| | |
|---|---|
| *H02H 3/093* | (2006.01) |
| *H02H 3/087* | (2006.01) |
| *H02H 7/12* | (2006.01) |
| *H02H 7/122* | (2006.01) |
| *H02H 9/02* | (2006.01) |
| *H02M 1/32* | (2007.01) |
| *H02M 3/155* | (2006.01) |
| *H02M 7/217* | (2006.01) |

(52) U.S. Cl.
CPC ............ *H02H 3/093* (2013.01); *H02H 3/087* (2013.01); *H02H 7/122* (2013.01); *H02H 7/1213* (2013.01); *H02H 9/02* (2013.01); *H02M 1/32* (2013.01); *H02M 3/155* (2013.01); *H02M 7/217* (2013.01)

(58) Field of Classification Search
CPC ...... H02H 3/087; H02H 3/093; H02H 7/1213; H02H 7/122; H02H 9/02; H02M 1/32; H02M 3/155; H02M 7/217

USPC ............................................. 361/18
See application file for complete search history.

(56) References Cited

U.S. PATENT DOCUMENTS

| | | | |
|---|---|---|---|
| 2010/0123978 A1* | 5/2010 | Lin ...................... | H02H 7/1213 361/18 |
| 2012/0049829 A1* | 3/2012 | Murakami .............. | H02M 1/32 323/288 |

(Continued)

FOREIGN PATENT DOCUMENTS

WO   2012/157242   11/2012

*Primary Examiner* — Kevin J Comber
(74) *Attorney, Agent, or Firm* — Fish & Richardson P.C.

(57) ABSTRACT

A semiconductor device includes an integration of a first external terminal to which a DC input voltage is input, a second external terminal to which a rectifying and smoothing circuit is externally connected, an output transistor connected between the first external terminal and the second external terminal, a control circuit arranged to turn on and off the output transistor so that a desired DC output voltage can be obtained from the rectifying and smoothing circuit, a current detection circuit arranged to generate a sense voltage corresponding to an on-current of the output transistor, and an overcurrent protection circuit arranged to monitor the sense voltage so as to perform an overcurrent protection operation. The overcurrent protection circuit performs a first overcurrent protection operation of a pulse-by-pulse method when detecting that the sense voltage exceeds a first threshold value voltage, and performs a second overcurrent protection operation of a timer latch method when detecting that the sense voltage continues to increase though the first overcurrent protection operation is being performed.

14 Claims, 10 Drawing Sheets

(56) References Cited

U.S. PATENT DOCUMENTS

2013/0343096 A1* 12/2013 Stuler .................... H02M 1/32
363/21.02
2014/0218988 A1 8/2014 Hayashi et al.

* cited by examiner

SEMICONDUCTOR DEVICE

CROSS-REFERENCE TO RELATED APPLICATIONS

This application claims priority based on Japanese Patent Applications No. 2015-190702 filed on Sep. 29, 2015, the contents of which are hereby incorporated by reference.

BACKGROUND OF THE INVENTION

Field of the Invention

The present invention relates to a semiconductor device including an overcurrent protection circuit.

Description of Related Art

PCT International Publication No. 2012/157242 filed by this applicant (hereinafter referred to as Patent Document 1) discloses a non-insulation step-down switching regulator having an overcurrent protection function, in which coil current is always monitored using an externally connected sense resistor disposed immediately close to the coil, so that an output transistor is forcibly turned off continuously in a period while the coil current exceeds a predetermined threshold current.

However, the conventional technique of Patent Document 1 needs the externally connected sense resistor, and hence there is a problem that a substrate area and cost are increased.

SUMMARY OF THE INVENTION

In view of the above-mentioned problem found by the inventor, an object of the invention disclosed in this specification is to provide an overcurrent protection circuit that can perform an appropriate overcurrent protection operation without necessity of an externally connected sense resistor.

A semiconductor device disclosed in this specification includes an integration of a first external terminal to which a DC input voltage is input, a second external terminal to which a rectifying and smoothing circuit is externally connected, an output transistor connected between the first external terminal and the second external terminal, a control circuit arranged to turn on and off the output transistor so that a desired DC output voltage can be obtained from the rectifying and smoothing circuit, a current detection circuit arranged to generate a sense voltage corresponding to an on-current of the output transistor, and an overcurrent protection circuit arranged to monitor the sense voltage so as to perform an overcurrent protection operation. The overcurrent protection circuit performs a first overcurrent protection operation of a pulse-by-pulse method when detecting that the sense voltage exceeds a first threshold value voltage, and performs a second overcurrent protection operation of a timer latch method when detecting that the sense voltage continues to increase though the first overcurrent protection operation is being performed.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

Electronic Apparatus

Figure 1:
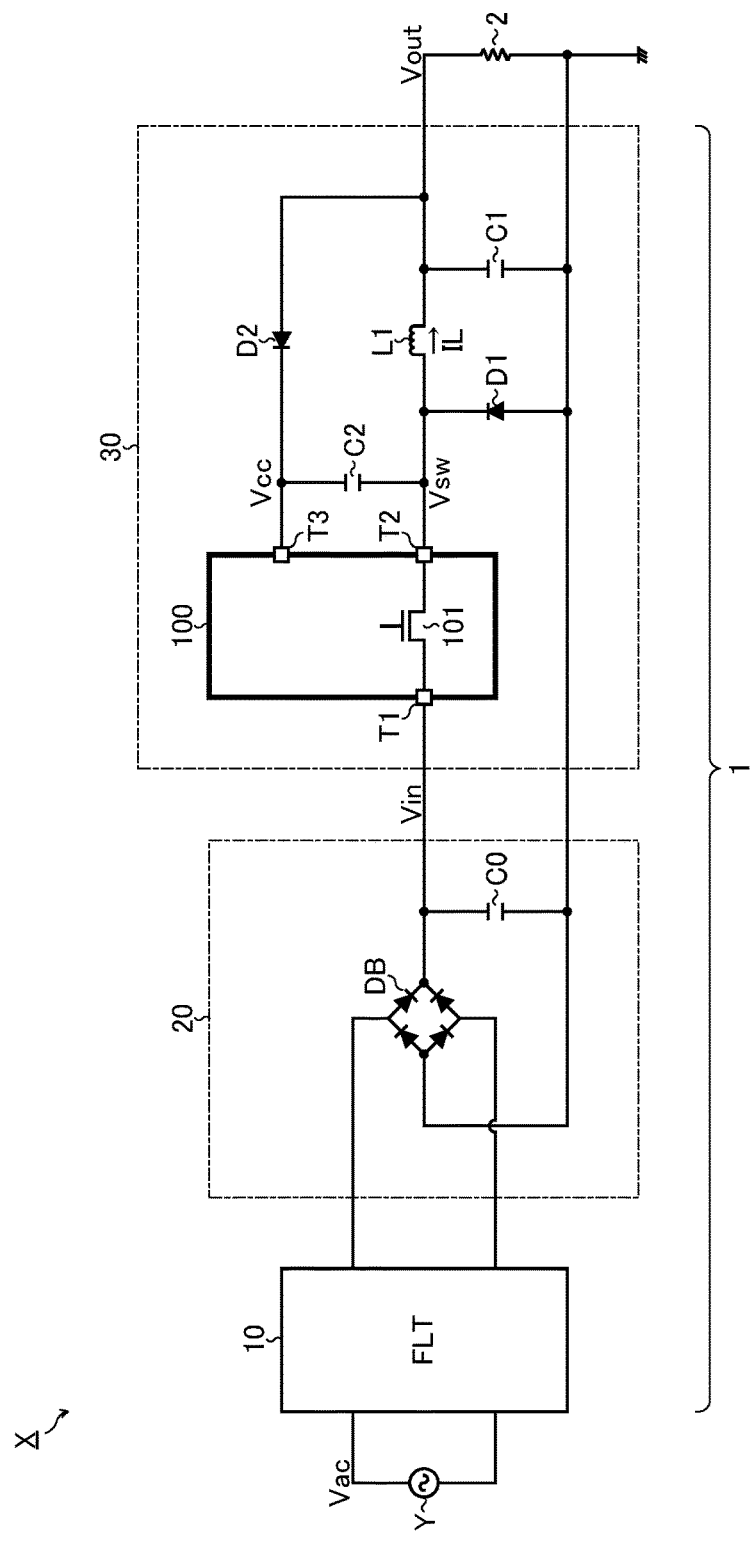
FIG. 1 is a circuit block diagram illustrating an overall structure of an electronic apparatus.

FIG. 1 is a circuit block diagram illustrating an overall structure of an electronic apparatus. An electronic apparatus X of this structural example includes a power supply device 1 that receives supply of an AC input voltage Vac from an AC power source Y so as to generate a desired DC output voltage Vout, and a load 2 that receives supply of the DC output voltage Vout so as to operate.

Power Supply Device

Continuously, with reference to FIG. 1, the power supply device 1 is described. The power supply device 1 includes a filter 10, an AC/DC converter 20, and a DC/DC converter 30.

The filter 10 eliminates noise and surge superimposed on the AC input voltage Vac. The filter 10 includes an X capacitor, a common mode filter, a fuse element, and the like.

The AC/DC converter 20 generates a DC input voltage Vin from the AC input voltage Vac that is input via the filter 10. The AC/DC converter 20 includes a diode bridge DB for full wave rectification and a capacitor C0 for output smoothing.

The DC/DC converter 30 is a non-insulation step-down switching regulator that steps down the DC input voltage Vin so as to generate the desired DC output voltage Vout, and supplies the same to the load 2.

DC/DC Converter

Continuously, with reference to FIG. 1, the DC/DC converter 30 is described. The DC/DC converter 30 includes a semiconductor device 100 and discrete components (a coil L1, diodes D1 and D2, and capacitors C1 and C2) that are externally connected to the semiconductor device 100.

The semiconductor device 100 is a main controller (so-called a switching control IC) of the DC/DC converter 30, and has external terminals T1 to T3 as means for establishing electric connection with the outside of the device. The external terminal T1 (DRAIN pin) corresponds to an input terminal of the DC input voltage Vin. The external terminal T2 (GND_IC pin) corresponds to an output terminal of a switched voltage Vsw. The external terminal T3 (VCC pin) corresponds to an input terminal of a power supply voltage Vcc.

A first terminal of the coil L1 and a cathode of the diode D1 are both connected to the external terminal T2. A second terminal of the coil L1 and a first terminal of the capacitor C1 are both connected to an output terminal of the output voltage Vout. An anode of the diode D1 and a second terminal of the capacitor C1 are both connected to a ground terminal. These discrete components (the coil L1, the diode D1, and the capacitor C1) function as a rectifying and smoothing circuit that rectifies and smoothes the switched voltage Vsw so as to generate the desired DC output voltage Vout. Further, instead of the diode D1, a synchronous rectifying transistor may be integrated in the semiconductor device 100.

A cathode of the diode D2 and a first terminal of the capacitor C2 are both connected to the external terminal T3. A second terminal of the capacitor C2 is connected to the external terminal T2. An anode of the diode D2 is connected to the output terminal of the output voltage Vout. These discrete components (the diode D2 and the capacitor C2) function as a power supply voltage generation circuit that rectifies and smoothes the output voltage Vout so as to generate the power supply voltage Vcc of the semiconductor device 100.

Further, inside the semiconductor device 100, an output transistor 101 is disposed between the external terminal T1 and the external terminal T2, and a current path of the coil current IL is switched in accordance with an on/off state of the output transistor 101.

Figure 2:
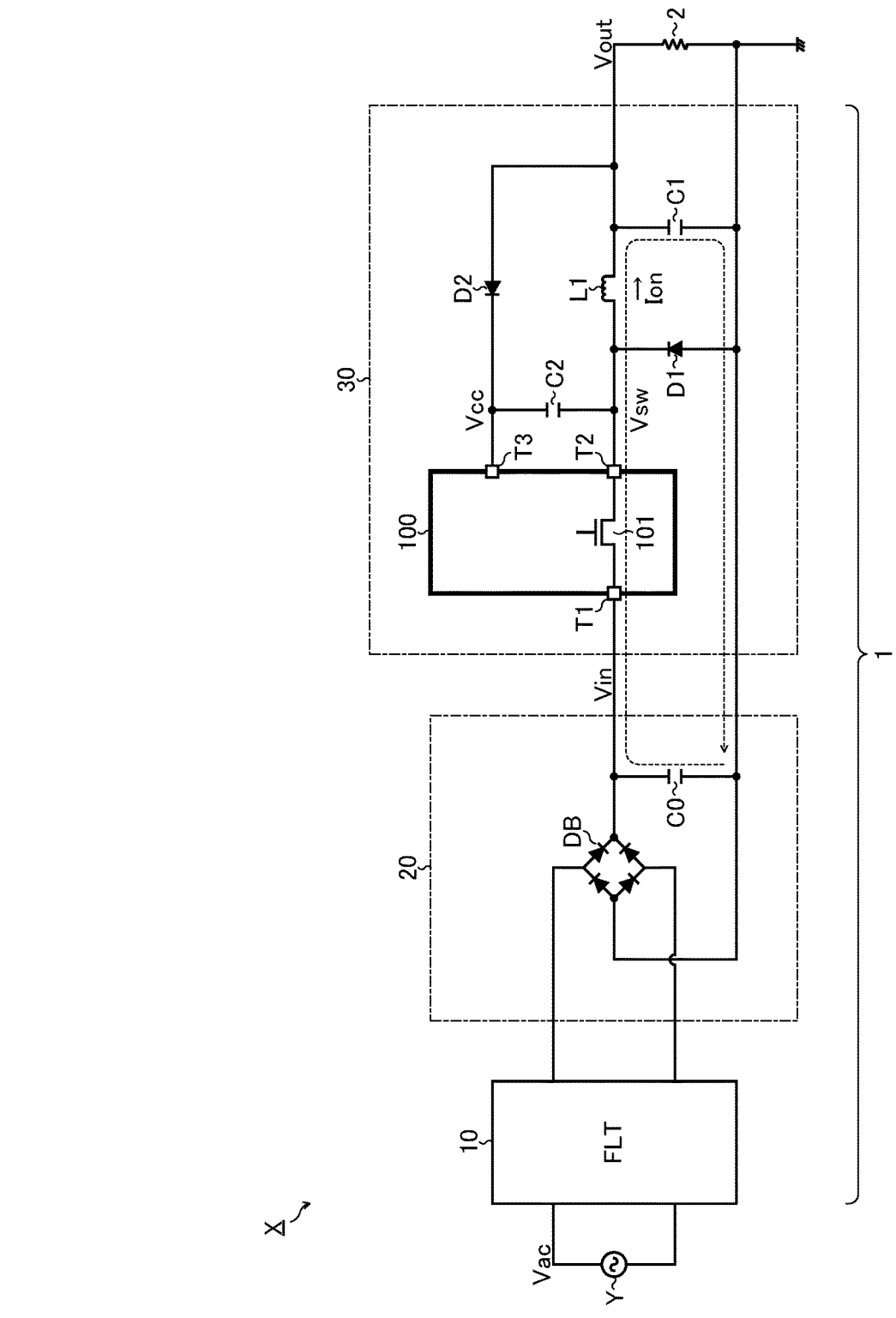
FIG. 2 is a current path diagram during an on period of an output transistor.

FIG. 2 is a current path diagram during an on period of the output transistor 101. When the output transistor 101 is turned on, an on-current Ion flows in the path from the capacitor C0 to the output transistor 101, to the coil L1, and to the capacitor C1, as illustrated by a broken line arrow.

Figure 3:
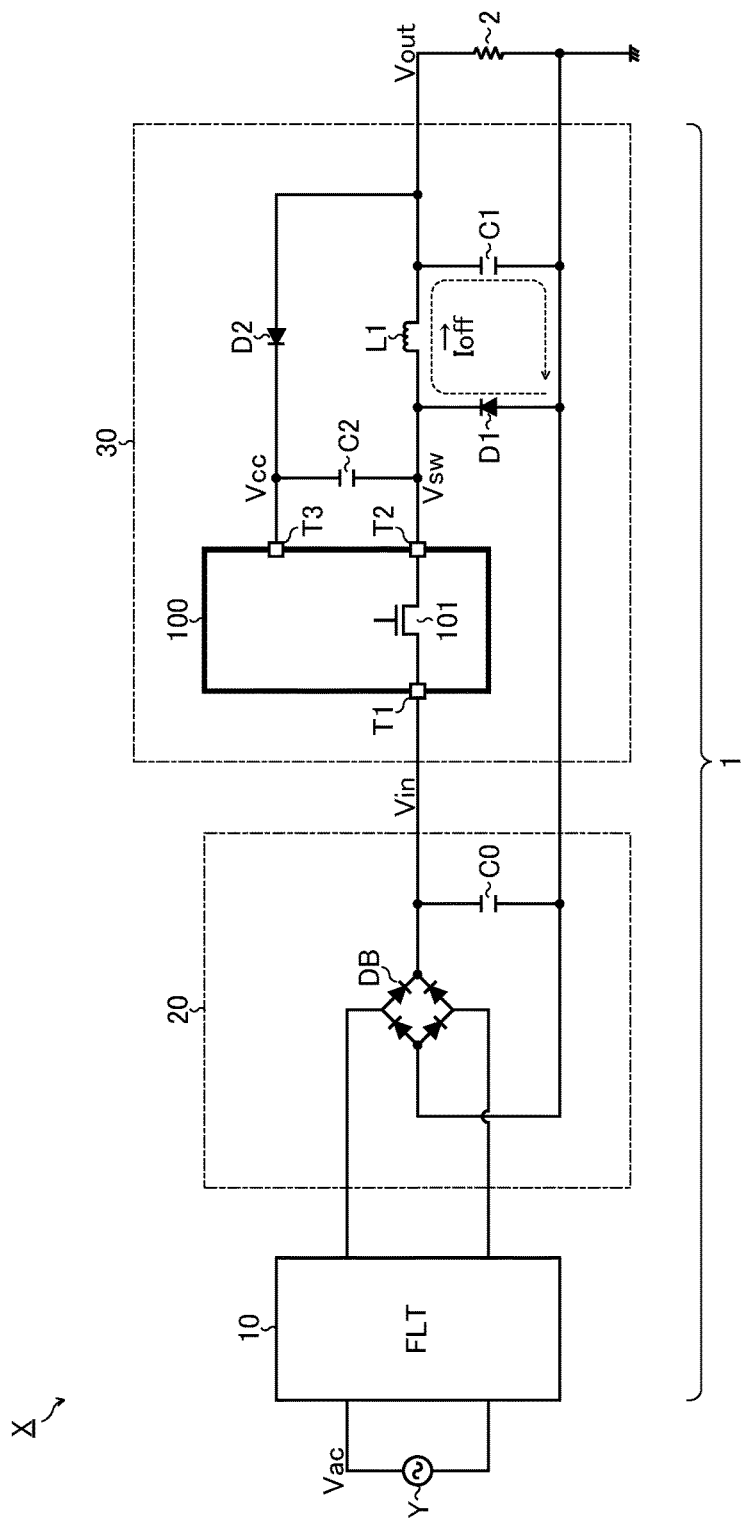
FIG. 3 is a current path diagram during an off period of the output transistor.

FIG. 3 is a current path diagram during an off period of the output transistor 101. When the output transistor 101 is turned off, an off-current Ioff flows in the path from the diode D1 to the coil L1, and to the capacitor C1, as illustrated by a broken line arrow.

Semiconductor Device

Figure 4:
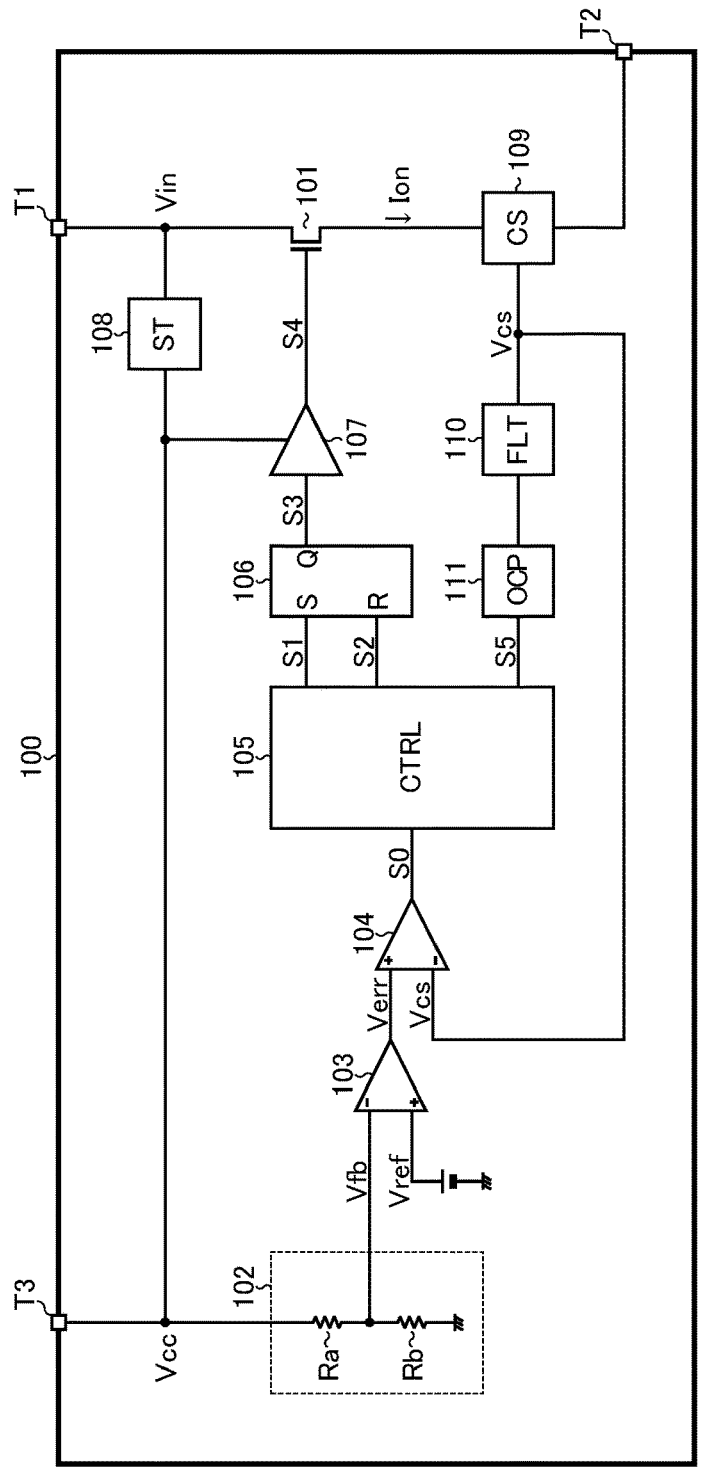
FIG. 4 is a block diagram illustrating a basic structure of a semiconductor device.

FIG. 4 is a block diagram illustrating a basic structure of the semiconductor device 100. The semiconductor device 100 of this structural example includes an integration of the output transistor 101, a feedback voltage generation circuit 102, an error amplifier circuit 103, a comparator circuit 104, a control circuit 105, an RS flip-flop circuit 106, a driving circuit 107, a start circuit 108, a current detection circuit 109, a filter circuit 110, and an overcurrent protection circuit 111. Note that it is possible to appropriately incorporate various circuit blocks (an internal power supply circuit, a decrease voltage protection circuit, a temperature protection circuit, an overvoltage protection circuit, and the like) in the semiconductor device 100, in addition to the circuit blocks described above.

The output transistor 101 is a switching element connected between the external terminal T1 and the external terminal T2. In the example illustrated in this diagram, an N-channel metal oxide semiconductor (MOS) field effect transistor is used as the output transistor 101. A drain of the output transistor 101 is connected to the external terminal T1. A source of the output transistor 101 is connected to the external terminal T2. A gate of the output transistor 101 is connected to an output terminal of the driving circuit 107 (i.e. an output terminal of a gate signal S4). The output transistor 101 is turned on when the gate signal S4 is at a high level and is turned off when the gate signal S4 is at a low level. Note that it is possible to use a P-channel MOS field effect transistor as the output transistor 101.

The feedback voltage generation circuit 102 includes resistors Ra and Rb connected in series between the external terminal T3 and the ground terminal, and the power supply voltage Vcc (nearly equal to the output voltage Vout) is divided at a predetermined division ratio α (=Rb/(Ra+Rb)), so that a feedback voltage Vfb is output from a connection node between the resistor Ra and the resistor Rb. Further, if the power supply voltage Vcc is within an input dynamic range of the error amplifier circuit 103, the feedback voltage generation circuit 102 can be eliminated so that the power supply voltage Vcc is directly input to the error amplifier circuit 103.

The error amplifier circuit 103 generates an error voltage Verr corresponding to a difference between a reference voltage Vref input to a non-inverting input terminal (+) and the feedback voltage Vfb input to an inverting input terminal (−) (corresponding to a divided voltage of the output voltage Vout). The error voltage Verr increases when the feedback voltage Vfb is lower than the reference voltage Vref and decreases when the feedback voltage Vfb is higher than the reference voltage Vref.

The comparator circuit 104 compares the error voltage Verr input to the non-inverting input terminal (+) with a sense voltage Vcs input to the inverting input terminal (−) so as to generate a pulse width modulation signal S0. The pulse width modulation signal S0 becomes the high level when the error voltage Verr is higher than the sense voltage Vcs and becomes the low level when the error voltage Verr is lower than the sense voltage Vcs. Further, in the example of this diagram, the sense voltage Vcs is directly input to the comparator circuit 104, but as another structure, it is possible to input to the comparator circuit 104 a sum voltage of the sense voltage Vcs plus a slope voltage having a triangular waveform or a sawtooth waveform, for example. In addition, if current mode control is not necessary, it is possible to input only the slope voltage described above to the comparator circuit 104.

The control circuit 105 generates an ON signal S1 and an OFF signal S2 according to the pulse width modulation signal S0 so that the desired DC output voltage Vout can be obtained from the rectifying and smoothing circuit (L1, D1, C1) described above. The ON signal S1 is a reference clock signal having a predetermined switching frequency fsw. The OFF signal S2 is a one-shot signal generated by a trigger of a pulse edge of the pulse width modulation signal S0. However, the method of driving the output transistor 101 by the control circuit 105 is not limited to the pulse width modulation method, but any method such as a pulse frequency modulation method may be adopted.

The RS flip-flop circuit 106 receives inputs of the ON signal S1 and the OFF signal S2 so as to generate an ON/OFF control signal S3. More specifically, the RS flip-flop circuit 106 sets the ON/OFF control signal S3 to the high level at a pulse edge of the ON signal S1, and resets the ON/OFF control signal S3 to the low level at a pulse edge of the OFF signal S2.

The driving circuit 107 receives supply of the power supply voltage Vcc so as to operate, and enhances current ability of the ON/OFF control signal S3 so as to generate the gate signal S4. When the ON/OFF control signal S3 is at the high level, the gate signal S4 becomes the high level, and the output transistor 101 is turned on. On the other hand, when the ON/OFF control signal S3 is at the low level, the gate signal S4 becomes the low level, and the output transistor 101 is turned off.

When the DC/DC converter 30 is started, the start circuit 108 makes a short circuit between the external terminal T1 and the external terminal T3 so as to increase the power supply voltage Vcc using the DC input voltage Vin. Accordingly, even if a sufficient power supply voltage Vcc cannot be generated from the output voltage Vout, there is no problem in the on/off control of the output transistor 101.

The current detection circuit 109 uses a wiring resistance of the current path in which the on-current Ion flows, an on-resistance of the output transistor 101, or an on-resistance of a transistor for monitoring current connected in parallel to the output transistor 101, as a sense resistor, and hence generates the sense voltage Vcs corresponding to the on-current Ion. In other words, the sense voltage Vcs becomes higher as the on-current Ion is larger, and becomes lower as the on-current Ion is smaller.

Further, in this diagram, there is illustrated an example of using a resistance component of a metal wiring between the source of the output transistor 101 and the external terminal T2, in which the current detection circuit 109 is disposed at the position. However, the position of the current detection circuit 109 is not limited to this. For example, when using a resistance component of a metal wiring between the external terminal T1 and the drain of the output transistor 101, the current detection circuit 109 is disposed not at the source side but at the drain side of the output transistor 101. In addition, when using an on-resistance of the output transistor 101, the current detection circuit 109 is connected in parallel to the output transistor 101.

The filter circuit 110 is connected between the current detection circuit 109 and the overcurrent protection circuit 111 so as to eliminate noise components (switching noise and the like) superimposed on the sense voltage Vcs.

The overcurrent protection circuit 111 monitors the sense voltage Vcs input via the filter circuit 110 and generates an overcurrent protection signal S5, so as to perform an overcurrent protection operation. More specifically, the overcurrent protection circuit 111 generates the overcurrent protection signal S5, so as to perform a first overcurrent protection operation of a pulse-by-pulse method when detecting that the sense voltage Vcs exceeds a first threshold value voltage Vth1, and to perform a second overcurrent protection operation of a timer latch method when detecting that the sense voltage Vcs continues to increase though the first overcurrent protection operation is being performed. In the following description, a structure and an operation of the overcurrent protection circuit 111 are described in detail.

Overcurrent Protection Circuit (First Embodiment)

Figure 5:
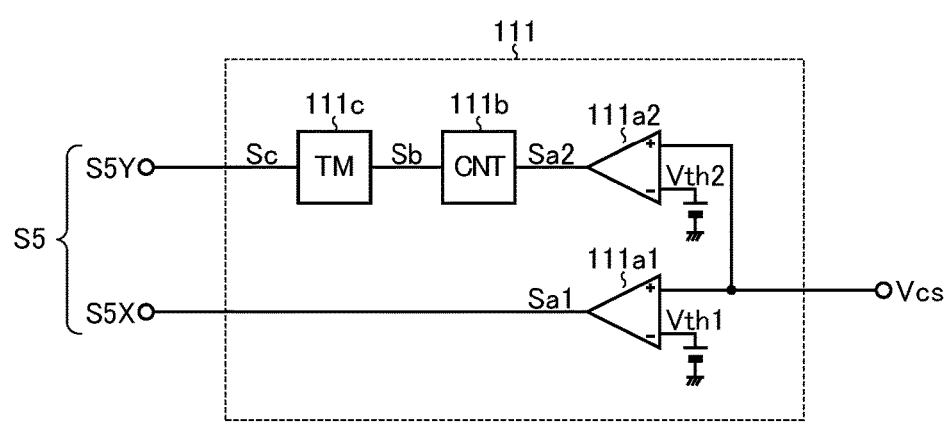
FIG. 5 is a block diagram illustrating a first embodiment of an overcurrent protection circuit.

FIG. 5 is a block diagram illustrating a first embodiment of the overcurrent protection circuit 111. The overcurrent protection circuit 111 of this embodiment includes comparators 111a1 and 111a2, a counter 111b, and a timer 111c, and monitors the sense voltage Vcs so as to generate the overcurrent protection signal S5. Further, the overcurrent protection signal S5 includes a first overcurrent protection signal S5X for the first overcurrent protection operation and a second overcurrent protection signal S5Y for the second overcurrent protection operation.

The comparator 111a1 compares the sense voltage Vcs input to the non-inverting input terminal (+) with the first threshold value voltage Vth1 input to the inverting input terminal (−) so as to generate a first comparison signal Sa1. The first comparison signal Sa1 becomes the low level when the sense voltage Vcs is lower than the first threshold value voltage Vth1, and becomes the high level when the sense voltage Vcs is higher than the first threshold value voltage Vth1. A relationship between the sense voltage Vcs and the first threshold value voltage Vth1 can be read as a relationship between the on-current Ion and a first threshold current Ith1. In other words, the first comparison signal Sa1 becomes the low level when the on-current Ion is smaller than the first threshold current Ith1, and becomes the high level when the on-current Ion is larger than the first threshold current Ith1. Further, the first comparison signal Sa1 is output to the control circuit 105 as the first overcurrent protection signal S5X.

The comparator 111a2 compares the sense voltage Vcs input to the non-inverting input terminal (+) with a second threshold value voltage Vth2 (>Vth1) input to the inverting input terminal (−) so as to generate a second comparison signal Sa2. The second comparison signal Sa2 becomes the low level when the sense voltage Vcs is lower than the second threshold value voltage Vth2, and becomes the high level when the sense voltage Vcs is higher than the second threshold value voltage Vth2. A relationship between the sense voltage Vcs and the second threshold value voltage Vth2 can be read as a relationship between the on-current Ion and a second threshold current Ith2 (>Ith1). In other words, the second comparison signal Sa2 becomes the low level when the on-current Ion is smaller than the second threshold current Ith2, and becomes the high level when the on-current Ion is larger than the second threshold current Ith2.

The counter 111b generates a one-shot signal Sb when detecting pulses of the second comparison signal Sa2 continuously for a plurality of periods.

The timer 111c generates a timer signal Sc to be the high level for a predetermined time T by a trigger of a pulse edge of the one-shot signal Sb. The timer 111c may be either a digital timer or an analog timer. Note that the timer signal Sc is output to the control circuit 105 as the second overcurrent protection signal S5Y.

Figure 6:
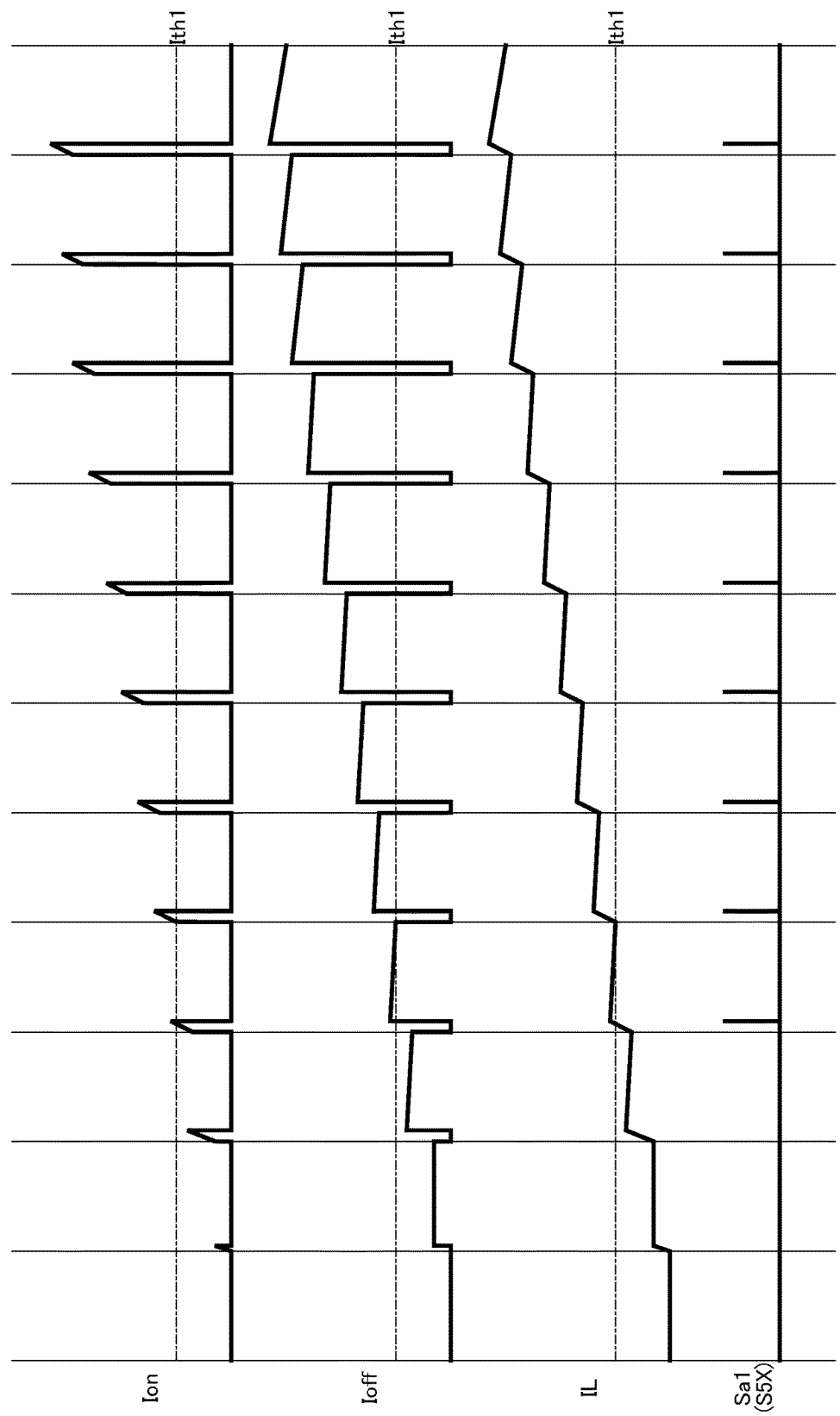
FIG. 6 is a timing chart illustrating a first overcurrent protection operation of a pulse-by-pulse method.

First, prior to detailed description of the overcurrent protection operation of the first embodiment, there is described an outline and a problem of the first overcurrent protection operation of the pulse-by-pulse method using the first overcurrent protection signal S5X with reference to FIG. 6. FIG. 6 is a timing chart illustrating the first overcurrent protection operation, in which the on-current Ion, the off-current Ioff, the coil current IL (=Ion+Ioff), and the first comparison signal Sa1 (i.e. the first overcurrent protection signal S5X) are shown.

When the on-current Ion becomes larger than the first threshold current Ith1 so that the first overcurrent protection signal S5X is raised to the high level, the control circuit 105 forcibly turns off the output transistor 101 until the on timing of the next period. In this way, in the first overcurrent protection operation of the pulse-by-pulse method, the forced stop and self-reset of the switching operation are repeated every period while the on-current Ion exceeds the first threshold current Ith1. Accordingly, even if an overcurrent is temporarily detected due to a load fluctuation or the like, the switching operation is not forced to stop continuously, and hence the output voltage Vout can be stably generated.

However, if the output terminal of the output voltage Vout is short-circuited to the ground (to the ground terminal or a low potential terminal equivalent to the ground terminal) via a low impedance path, for example, a decrease amount $\Delta IL$ of the coil current IL (determined corresponding to Vout/L) during the forced off period of the output transistor 101 is small. Therefore sufficient overcurrent protection cannot be performed, and the coil current IL continues to increase as illustrated in this chart. Consequently, it is necessary to use a large current capacity element as the coil L1, which causes a problem of cost increase.

Further, as described above in Description of Related Art, if the externally connected sense resistor is disposed immediately close to the coil L1, not only the on-current Ion but also the off-current Ioff can be monitored, and hence more appropriate overcurrent protection can be performed. However, in order to adopt this structure, it is necessary to add the externally connected sense resistor, and hence there is a problem that a substrate area and cost are increased.

Figure 7:
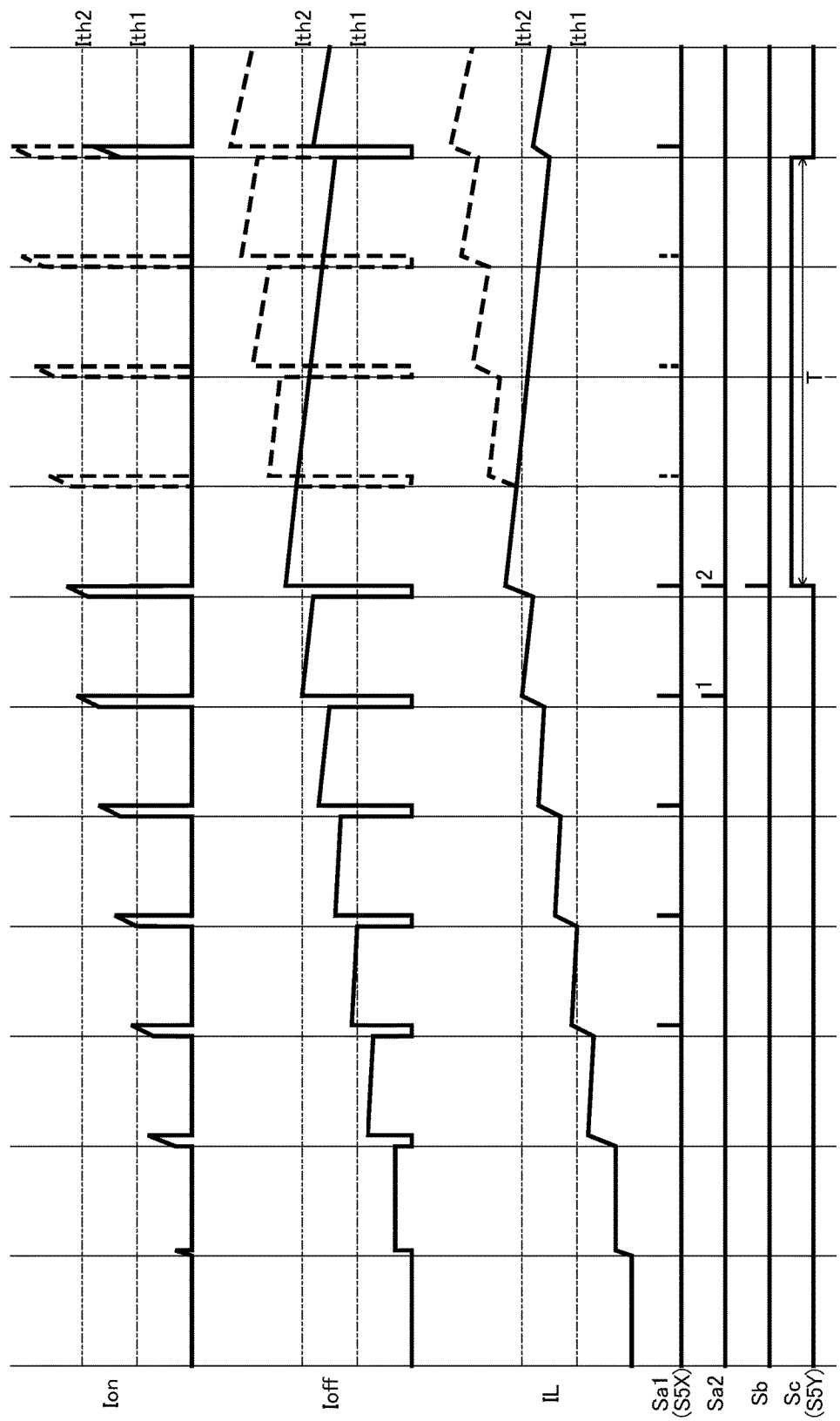
FIG. 7 is a timing chart illustrating an overcurrent protection operation of a first embodiment.

Next, with reference to FIG. 7, the overcurrent protection operation of the first embodiment is described in detail. FIG. 7 is a timing chart illustrating the overcurrent protection operation of the first embodiment, in which the on-current Ion, the off-current Ioff, the coil current IL (=Ion+Ioff), the first comparison signal Sa1 (i.e. the first overcurrent protection signal S5X), the second comparison signal Sa2, the one-shot signal Sb, and the timer signal Sc (i.e. the second overcurrent protection signal S5) are shown. Further in this chart, broken lines indicate the behavior when only the first overcurrent protection operation of the pulse-by-pulse method is performed (the behavior illustrated in FIG. 6) for comparison and reference.

When the on-current Ion becomes larger than the first threshold current Ith1 so that the first overcurrent protection signal S5X is raised to the high level, the control circuit 105 forcibly turns off the output transistor 101 until the on timing of the next period. In this way, when it is determined that the on-current Ion exceeds the first threshold current Ith1, the first overcurrent protection operation of the pulse-by-pulse method is performed as described above with reference to FIG. 6.

On the other hand, if the on-current Ion continues to increase though the first overcurrent protection operation is being performed, and if the on-current Ion becomes higher than the second threshold current Ith2 as a result, a pulse is generated in the second comparison signal Sa2. Further, if the increase of the on-current Ion continues for a plurality of periods after that, and if a plurality of (two in the illustrated example) pulses are generated continuously in the second comparison signal Sa2, a pulse is generated in the one-shot signal Sb.

In this case, the second overcurrent protection signal S5Y (i.e. the timer signal Sc) is raised to the high level by a trigger of the pulse of the one-shot signal Sb, and then is maintained at the high level for the predetermined time T. Note that the predetermined time T is longer than a switching period (=1/fsw).

When the second overcurrent protection signal S5Y is raised to the high level, the control circuit 105 forcibly turns off the output transistor 101 during the high level period of the second overcurrent protection signal S5Y (i.e. the predetermined time T). In this way, if the on-current Ion continues to increase though the first overcurrent protection operation of the pulse-by-pulse method is being performed, it is switched to the second overcurrent protection operation of the timer latch method, and the output transistor 101 is forcibly turned off for a plurality of periods. Accordingly, even if the output terminal of the output voltage Vout is short-circuited to the ground, for example, appropriate overcurrent protection can be performed.

Overcurrent Protection Circuit (Second Embodiment)

Figure 8:
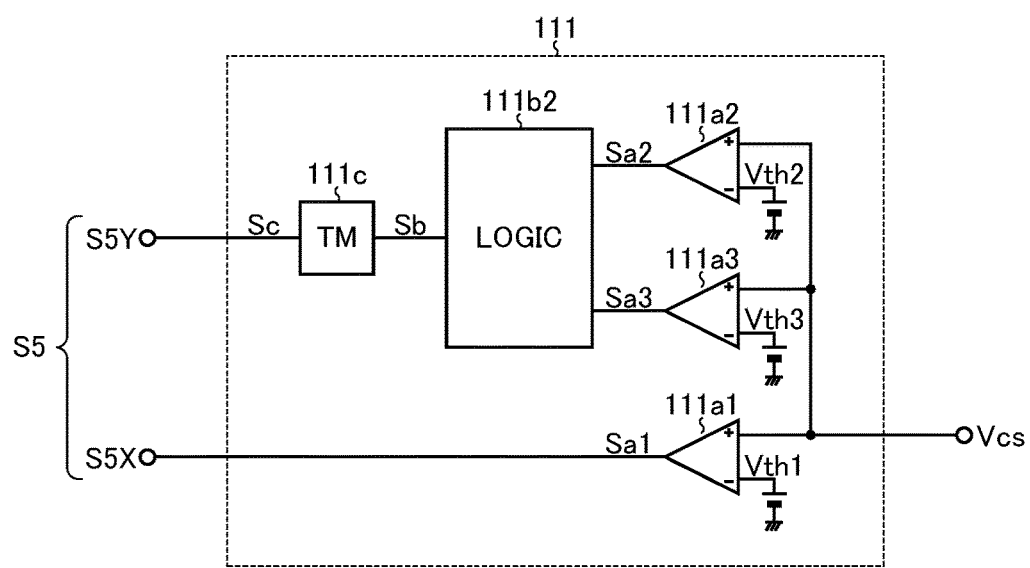
FIG. 8 is a block diagram illustrating a second embodiment of the overcurrent protection circuit.

FIG. 8 is a block diagram illustrating a second embodiment of the overcurrent protection circuit 111. The overcurrent protection circuit 111 of this embodiment has a structure based on the first embodiment (FIG. 5), in which a comparator 111a3 is added, and further the counter 111b is replaced with a logic unit 111b2. Accordingly, the same structural element as in the first embodiment is denoted by the same reference numeral as in FIG. 5 so that overlapping description is omitted. In the following description, characteristic parts of the second embodiment are mainly described.

The comparator 111a3 compares the sense voltage Vcs input to the non-inverting input terminal (+) with a third threshold value voltage Vth3 input to the inverting input terminal (−) (here, Vth1<Vth3<Vth2 holds), so as to generate a third comparison signal Sa3. The third comparison signal Sa3 becomes the low level when the sense voltage Vcs is lower than the third threshold value voltage Vth3, and becomes the high level when the sense voltage Vcs is higher than the third threshold value voltage Vth3. A relationship between the sense voltage Vcs and the third threshold value voltage Vth3 can be read as a relationship between the on-current Ion and a third threshold current Ith3 (here, Ith1<Ith3<Ith2 holds). In other words, the third comparison signal Sa3 becomes the low level when the on-current Ion is smaller than the third threshold current Ith3, and becomes the high level when the on-current Ion is larger than the third threshold current Ith3.

The logic unit 111b2 generates the one-shot signal Sb when detecting a pulse of the third comparison signal Sa3 and then detecting a pulse of the second comparison signal Sa2 in the next period.

Figure 9:
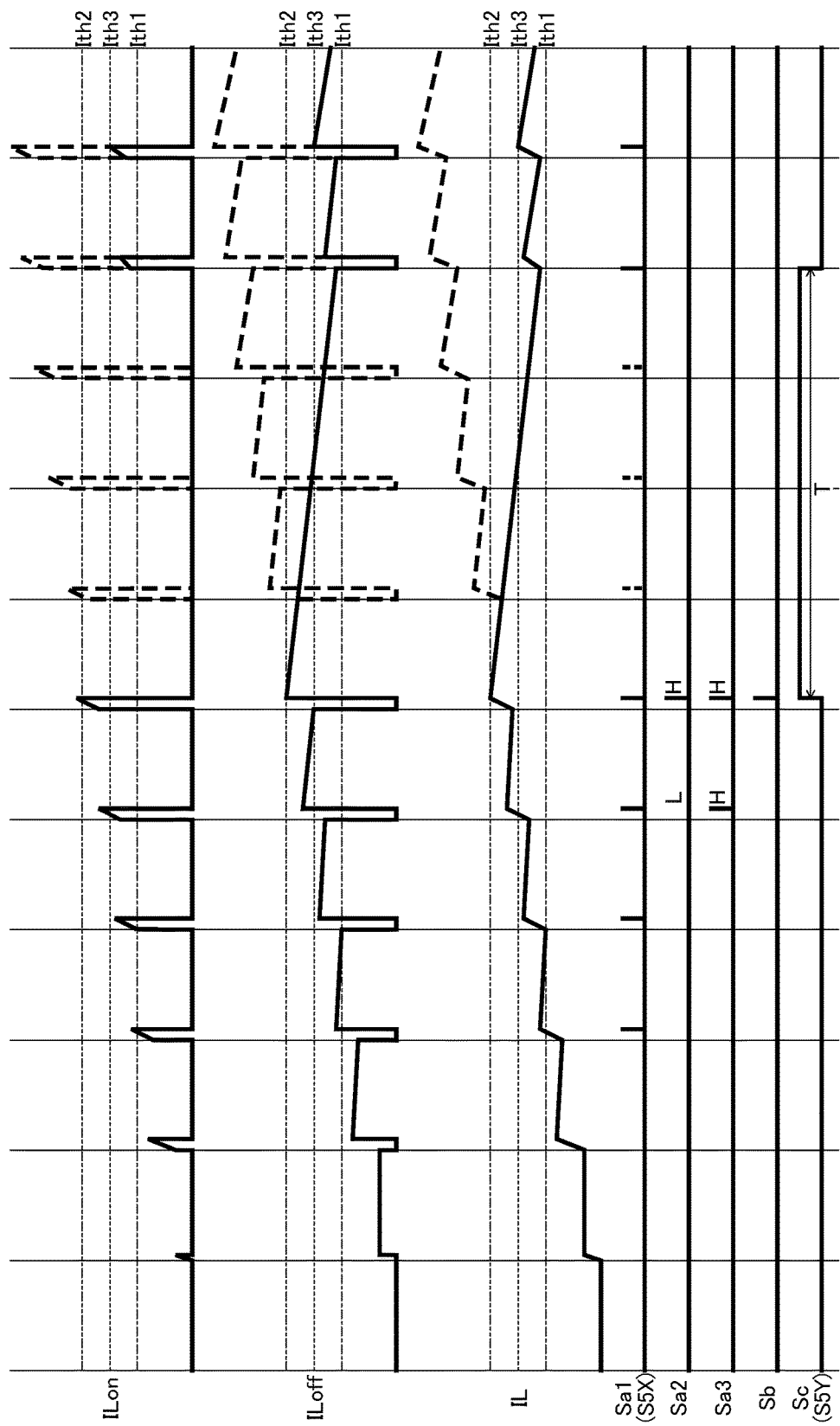
FIG. 9 is a timing chart illustrating an overcurrent protection operation of a second embodiment.

FIG. 9 is a timing chart illustrating the overcurrent protection operation of the second embodiment, in which the on-current Ion, the off-current Ioff, the coil current IL (=Ion+Ioff), the first comparison signal Sa1 (i.e. the first overcurrent protection signal S5X), the second comparison signal Sa2, the third comparison signal Sa3, the one-shot signal Sb, and the timer signal Sc (i.e. the second overcurrent protection signal S5Y) are shown. Note that broken lines in this chart indicate the behavior when only the first overcurrent protection operation of the pulse-by-pulse method is performed (the behavior illustrated in FIG. 6) for comparison and reference.

When the on-current Ion becomes larger than the first threshold current Ith1 so that the first overcurrent protection signal S5X is raised to the high level, the control circuit 105 forcibly turned off the output transistor 101 until the on timing of the next period. In this way, when it is determined that the on-current Ion exceeds the first threshold current Ith1, the first overcurrent protection operation of the pulse-by-pulse method is performed, in the same manner as in the first embodiment (FIG. 7) described above.

On the other hand, if the on-current Ion continues to increase though the first overcurrent protection operation is being performed, and if the on-current Ion becomes higher than the third threshold current Ith3 as a result, a pulse is generated in the third comparison signal Sa3. Further, if the increase of the on-current Ion continues, and if a pulse of the second comparison signal Sa2 is generated in the next period, a pulse is generated in the one-shot signal Sb. In other words, the logic unit 111b2 generates a pulse in the one-shot signal Sb when detecting that the comparison signals Sa2 and Sa3 are switched from the low level and the high level to the high level and the high level, respectively.

In this case, the second overcurrent protection signal S5Y (i.e. the timer signal Sc) is raised to the high level by a trigger of the pulse of the one-shot signal Sb, and then is maintained at the high level for the predetermined time T.

Note that the predetermined time T is longer than a switching period (=1/fsw) as described above.

When the second overcurrent protection signal S5Y is raised to the high level, the control circuit 105 forcibly turns off the output transistor 101 during the high level period of the second overcurrent protection signal S5Y (i.e. the predetermined time T). In this way, if the on-current Ion continues to increase though the first overcurrent protection operation of the pulse-by-pulse method is being performed, it is switched to the second overcurrent protection operation of the timer latch method, and the output transistor 101 is forcibly turned off for a plurality of periods, in the same manner as in the first embodiment (FIG. 7) described above. Accordingly, even if the output terminal of the output voltage Vout is short-circuited to the ground, for example, appropriate overcurrent protection can be performed.

Application to Air Conditioner

Figure 10:
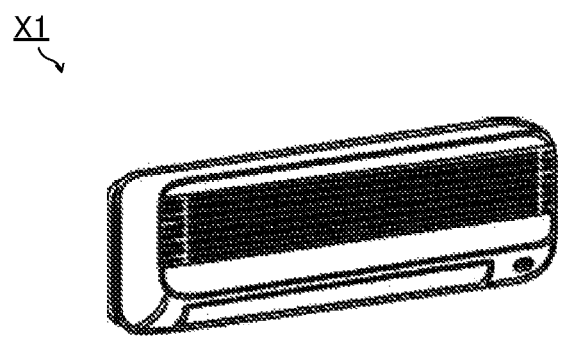
FIG. 10 is an external view of an air conditioner.

FIG. 10 is an external view of an air conditioner X1. The air conditioner X1 is an example of the electronic apparatus X including the power supply device 1. However, the power supply device 1 can be appropriately mounted in any electronic apparatus other than this.

Other Variations

Note that the various technical features disclosed in this specification can be variously modified within the scope without deviating from the spirit of the technical invention, other than the embodiments described above. In other words, the embodiments described above are merely examples in every aspect and should not be interpreted as limitations. The technical scope of the present invention is defined not by the above description of the embodiments but by the claims, and should be understood to include all modifications within the meaning and range equivalent to the scope of the claims.

INDUSTRIAL APPLICABILITY

The present invention can be applied to power supply devices mounted in various electronic apparatuses (such as an air conditioner, a vacuum cleaner, a refrigerator, and a wash machine).

What is claimed is:

1. A semiconductor device comprising an integration of:
a first external terminal to which a DC input voltage is input;
a second external terminal to which a rectifying and smoothing circuit is externally connected;
an output transistor connected between the first external terminal and the second external terminal;
a control circuit arranged to turn on and off the output transistor so that a desired DC output voltage can be obtained from the rectifying and smoothing circuit;
a current detection circuit arranged to generate a sense voltage corresponding to an on-current of the output transistor; and
an overcurrent protection circuit arranged to monitor the sense voltage so as to perform an overcurrent protection operation, wherein
the overcurrent protection circuit performs a first overcurrent protection operation of a pulse-by-pulse method when detecting that the sense voltage exceeds a first threshold value voltage, and performs a second overcurrent protection operation of a timer latch method when detecting that the sense voltage continues to increase though the first overcurrent protection operation is being performed, wherein
the overcurrent protection circuit includes a first comparator arranged to compare the sense voltage with the first threshold value voltage so as to generate a first comparison signal, and
the control circuit forcibly turns off the output transistor until an on timing of a next period so that the first overcurrent protection operation is performed according to the first comparison signal, wherein the overcurrent protection circuit includes
a second comparator arranged to compare the sense voltage with a second threshold value voltage higher than the first threshold value voltage so as to generate a second comparison signal,
a counter arranged to generate a one-shot signal when a pulse of the second comparison signal is detected continuously for a plurality of periods, and
a timer arranged to generate a timer signal for a predetermined time by a trigger of the one-shot signal, wherein
the control circuit forcibly turns off the output transistor for the predetermined time so that the second overcurrent protection operation is performed according to the timer signal.

2. The semiconductor device according to claim 1, further comprising an integrated filter circuit connected between the current detection circuit and the overcurrent protection circuit.

3. The semiconductor device according to claim 1, wherein the current detection circuit generates the sense voltage from the on-current using one of a wiring resistance of a current path in which the on-current flows, an on-resistance of the output transistor, and an on-resistance of a transistor for monitoring current connected in parallel to the output transistor.

4. A DC/DC converter comprising:
a semiconductor device according to claim 1; and
a rectifying and smoothing circuit externally connected to the semiconductor device so as to generate a desired DC output voltage.

5. The DC/DC converter according to claim 4, further comprising a power supply voltage generation circuit externally connected to the semiconductor device so as to generate a power supply voltage of the semiconductor device from the DC output voltage.

6. A power supply device comprising:
an AC/DC converter arranged to generate a DC input voltage from an AC input voltage; and
a DC/DC converter according to claim 4 arranged to generate a desired DC output voltage from the DC input voltage.

7. An electronic apparatus comprising:
a power supply device according to claim 6 arranged to generate a desired DC output voltage from a AC input voltage; and
a load arranged to receive supply of the DC output voltage so as to operate.

8. A semiconductor device comprising an integration of:
a first external terminal to which a DC input voltage is input;
a second external terminal to which a rectifying and smoothing circuit is externally connected;
an output transistor connected between the first external terminal and the second external terminal;

a control circuit arranged to turn on and off the output transistor so that a desired DC output voltage can be obtained from the rectifying and smoothing circuit;

a current detection circuit arranged to generate a sense voltage corresponding to an on-current of the output transistor; and an overcurrent protection circuit arranged to monitor the sense voltage so as to perform an overcurrent protection operation, wherein the overcurrent protection circuit performs a first overcurrent protection operation of a pulse-by-pulse method when detecting that the sense voltage exceeds a first threshold value voltage, and performs a second overcurrent protection operation of a timer latch method when detecting that the sense voltage continues to increase though the first overcurrent protection operation is being performed, wherein the overcurrent protection circuit includes a first comparator arranged to compare the sense voltage with the first threshold value voltage so as to generate a first comparison signal, and the control circuit forcibly turns off the output transistor until an on timing of a next period so that the first overcurrent protection operation is performed according to the first comparison signal, wherein the overcurrent protection circuit includes a second comparator arranged to compare the sense voltage with a second threshold value voltage higher than the first threshold value voltage so as to generate a second comparison signal, a third comparator arranged to compare the sense voltage with a third threshold value voltage higher than the first threshold value voltage and lower than the second threshold value voltage, so as to generate a third comparison signal, a logic unit arranged to generate a one-shot signal when a pulse of the third comparison signal is detected and then in the next period a pulse of the second comparison signal is detected, and a timer arranged to generate a timer signal for a predetermined time by a trigger of the one-shot signal, wherein the control circuit forcibly turns off the output transistor for the predetermined time so that the second overcurrent protection operation is performed according to the timer signal.

9. The semiconductor device according to claim 8, further comprising an integrated filter circuit connected between the current detection circuit and the overcurrent protection circuit.

10. The semiconductor device according to claim 8, wherein the current detection circuit generates the sense voltage from the on-current using one of a wiring resistance of a current path in which the on-current flows, an on-resistance of the output transistor, and an on-resistance of a transistor for monitoring current connected in parallel to the output transistor.

11. A DC/DC converter comprising:
a semiconductor device according to claim 8; and
a rectifying and smoothing circuit externally connected to the semiconductor device so as to generate a desired DC output voltage.

12. The DC/DC converter according to claim 11, further comprising a power supply voltage generation circuit externally connected to the semiconductor device so as to generate a power supply voltage of the semiconductor device from the DC output voltage.

13. A power supply device comprising:
an AC/DC converter arranged to generate a DC input voltage from an AC input voltage; and
a DC/DC converter according to claim 11 arranged to generate a desired DC output voltage from the DC input voltage.

14. An electronic apparatus comprising:
a power supply device according to claim 13 arranged to generate a desired DC output voltage from a AC input voltage; and
a load arranged to receive supply of the DC output voltage so as to operate.

* * * * *